United States Patent [19]

Cleveland, Jr.

[11] Patent Number: 5,114,227
[45] Date of Patent: May 19, 1992

[54] LASER TARGETING SYSTEM

[75] Inventor: William C. Cleveland, Jr., Santa Ana, Calif.

[73] Assignee: Loral Aerospace Corp., New York, N.Y.

[21] Appl. No.: 49,488

[22] Filed: May 14, 1987

[51] Int. Cl.⁵ .......................... G01C 1/00; F41G 5/06; G02F 1/00
[52] U.S. Cl. .................................. 356/152; 89/41.05; 359/154; 359/155; 359/164
[58] Field of Search .................... 455/604, 606, 607; 356/141, 152; 89/41.05; 244/3.11, 3.16

[56] References Cited

U.S. PATENT DOCUMENTS

| | | | |
|---|---|---|---|
| 3,217,097 | 5/1972 | Pauli et al. | |
| 3,715,953 | 1/1973 | Allan | |
| 3,778,007 | 12/1973 | Kearney | 244/3.16 |
| 3,953,131 | 4/1976 | Britz | 356/141 |
| 4,053,233 | 10/1977 | Bien et al. | 356/141 |
| 4,093,153 | 6/1977 | Bardash et al. | |
| 4,203,667 | 5/1980 | Pierce et al. | 356/152 |
| 4,267,562 | 1/1981 | Raimondi | |
| 4,279,036 | 2/1981 | Pfund | |
| 4,315,609 | 12/1982 | McLean et al. | |
| 4,386,848 | 6/1983 | Clendenin et al. | 356/5 |
| 4,737,028 | 4/1988 | Smith | 356/152 |

OTHER PUBLICATIONS

R. E. Nettles, *Unmanned Systems*, Summer 1986, pp. 10-42.

Johnson, "ASD Tests Airborne Laser Communications", *Journal of Electronic Defense*, Jun. 1986, pp. 53-56.

Primary Examiner—Stephen C. Buczinski
Attorney, Agent, or Firm—Edward J. Radlo; John S. Ferrell

[57] ABSTRACT

A laser targeting system comprises an airborne reconnaissance platform (1) disposed to conduct surveillance of enemy air, ground, and/or sea targets (5). The surveillance means (11) can be some combination of FLIR, laser, or radar devices. Platform (1) may be manned or may be a remote pilotless vehicle commanded by a ground control station (9). Several friendly units (2) are capable of firing weapons at the enemy targets (5). The friendly units (2) desire real-time targeting information, such as video images, range, and coordinates. The friendly units (2) typically desire information for only certain types of targets (5) or for those within proximate geographical areas. These selective requests are sent via a laser uplink (28) to platform (1), which determines the direction from which the request came by a direction determining means (17), and selectively processes the request by means of a decoder/controller (16).

11 Claims, 6 Drawing Sheets

LASER TARGETING SYSTEM

DESCRIPTION

1. Technical Field

This invention pertains to the field of using covert laser communications links to locate targets.

2. Background Art

U.S. Pat. No. 4,315,609 describes a target location determination and missile guidance system which differs from the present invention in that: 1) RF microwave rather than laser communications links are used. 2) Fixed ground stations are used, rather than mobile air, ground, and/or sea users. 3) The targets are not imaged. 4) A master ground station and two or more slave stations are needed to fire weapons at the target. 5) At least three ground stations are required to determine the location of reconnaissance aircraft 26. 6) There is no means for selective polling of target information by the ground users. 7) There is no means for authorizing or prioritizing recipients of reconnaissance information. 8) The locations of the ground stations have to be known in advance. 9) The reconnaissance function has to be performed by a human observer.

U.S. Pat. No. 4,093,153 describes a surface-to-air missile command system which differs from the present invention in that: 1) Reconnaissance is not performed; it is a defensive system only. 2) The ground modules are fixed (albeit portable) rather than mobile. 3) The fire control units 7 do not interrogate the central computer 11. 4) Only radar, which can be easily detected, is used to detect the targets. 5) A microwave link, rather than a laser link, is used between each fire control unit 7 and computer 11.

U.S. Pat. No. 4,279,036 shows an example of a laser communications link. Laser communications links 19, 28 form a part of the present invention. Also illustrative of a laser communications link is Johnson, "ASD Tests Airborne Laser Communications", *Journal of Electronic Defense*, June 1986, pp. 53-56.

Secondary references are U.S. Pat. Nos. 3,217,097; 3,715,953; and 4,267,562.

DISCLOSURE OF INVENTION

The real-time laser targeting system of the present invention comprises an airborne reconnaissance platform (1) disposed to surveille enemy targets (5). Friendly air, ground, and/or sea units (2) are capable of firing weapons at the enemy targets (5). By means of a first laser communications means (21, 28, 17), each friendly unit (2) can interrogate the airborne reconnaissance platform (1) as to targeting information regarding those targets (5) that are suitable for that friendly unit (2). By means of a second laser communications means (18, 19, 21), the airborne reconnaissance platform (1) informs, in a real-time fashion, the friendly units (2) as to targeting information regarding those targets (5) that are within the scope of friendly unit (2) interrogations.

The laser targeting system described in the instant specification offers the following advantages:

The system has a very high data bandwidth capability; video information (19) can be transmitted.

The laser data links (19, 28) are virtually undetectable by an enemy.

The laser data links (19, 28) are invulnerable to enemy battlefield electronic counter measures.

The targeting information (19) is delivered to the friendly units (2) in a real-time direct fashion.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
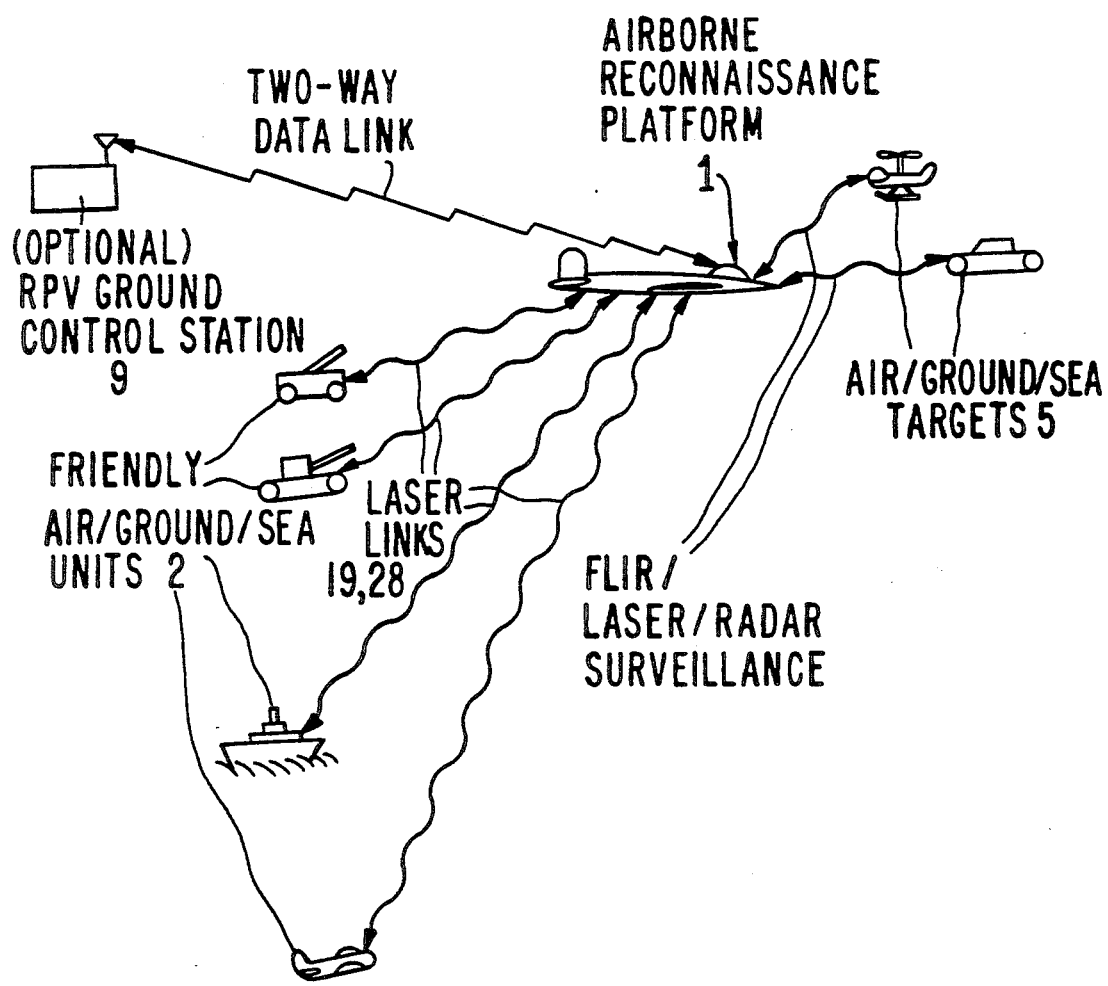
FIG. 1 is a schematic drawing showing the overall function of the present invention.

Airborne reconnaissance platform 1 may be manned or unmanned. When unmanned, it can be designated a remote pilotless vehicle (RPV); in this case, RPV ground control station 9 is present. Station 9 communicates with RPV 1 via a two-way communications link. If this link is an RF link, a horn antenna may be present on board platform 1.

The enemy units 5 may be any combination of air, ground, and sea units. One or more sensors 11 on board platform 1 conducts surveillance of the enemy units 5. The surveillance means 11 may include FLIR or visible video, laser, radar, etc. The video information, if present, is real-time imaging information. Sensors 11 can comprise a combined FLIR/laser unit sharing the same gimbal.

It is highly desirable that friendly air, ground, and/or sea units 2 be able to utilize the sensor 11 outputs on a real-time basis for targeting purposes. The present invention is a system to accomplish this.

Figure 6:
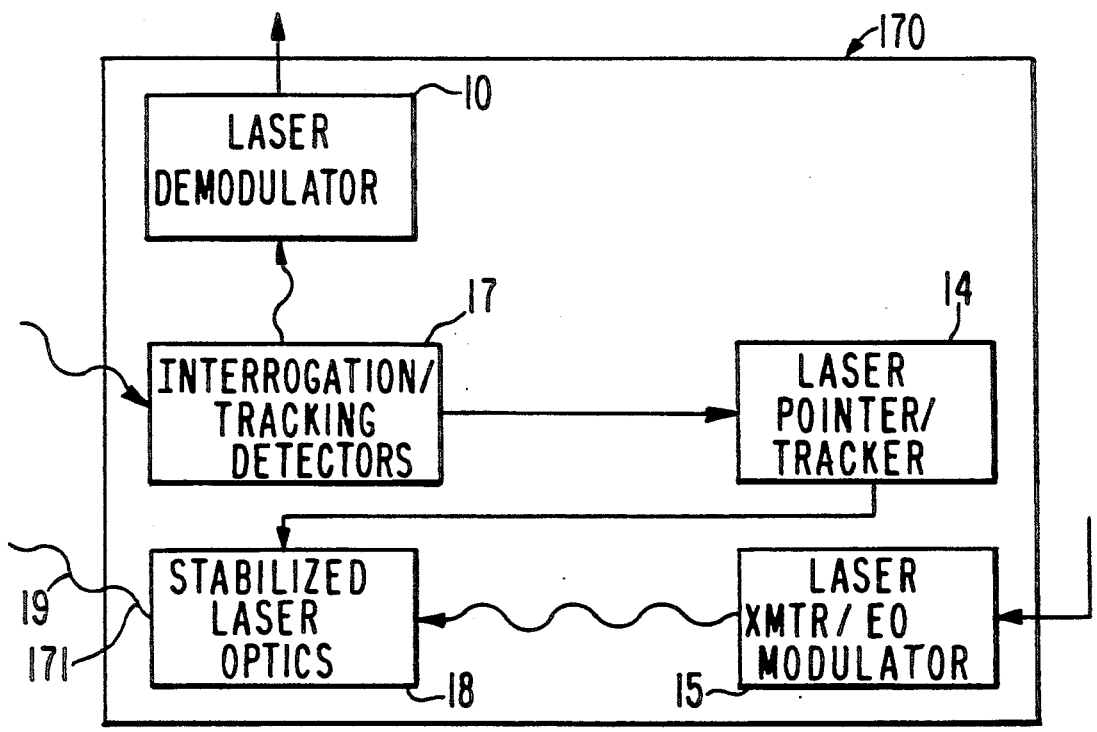
FIG. 6 is a functional block diagram showing important features within the second laser communication means 170 of the present invention.

Referring also to FIG. 6, the friendly units 2 interrogate platform 1 for targeting information of interest to them within their assigned sector of fire. If such targets 5 are or can be observed by the sensor(s) 11, platform 1 transmits the target data 171 (real-time imaging, range, azimuth and elevation angles, etc.) back to the interrogating friendly unit 2 via a covert laser communications link 19. The friendly units 2 utilize this information along with knowledge of the position of platform 1 (which can be determined by pointing and ranging apparatus on board either the friendly unit 2 or the platform 1) to engage the target 5 by firing weapons that are either located on board the friendly unit 2 or linked to friendly unit 2 by a command link.

Figure 2:
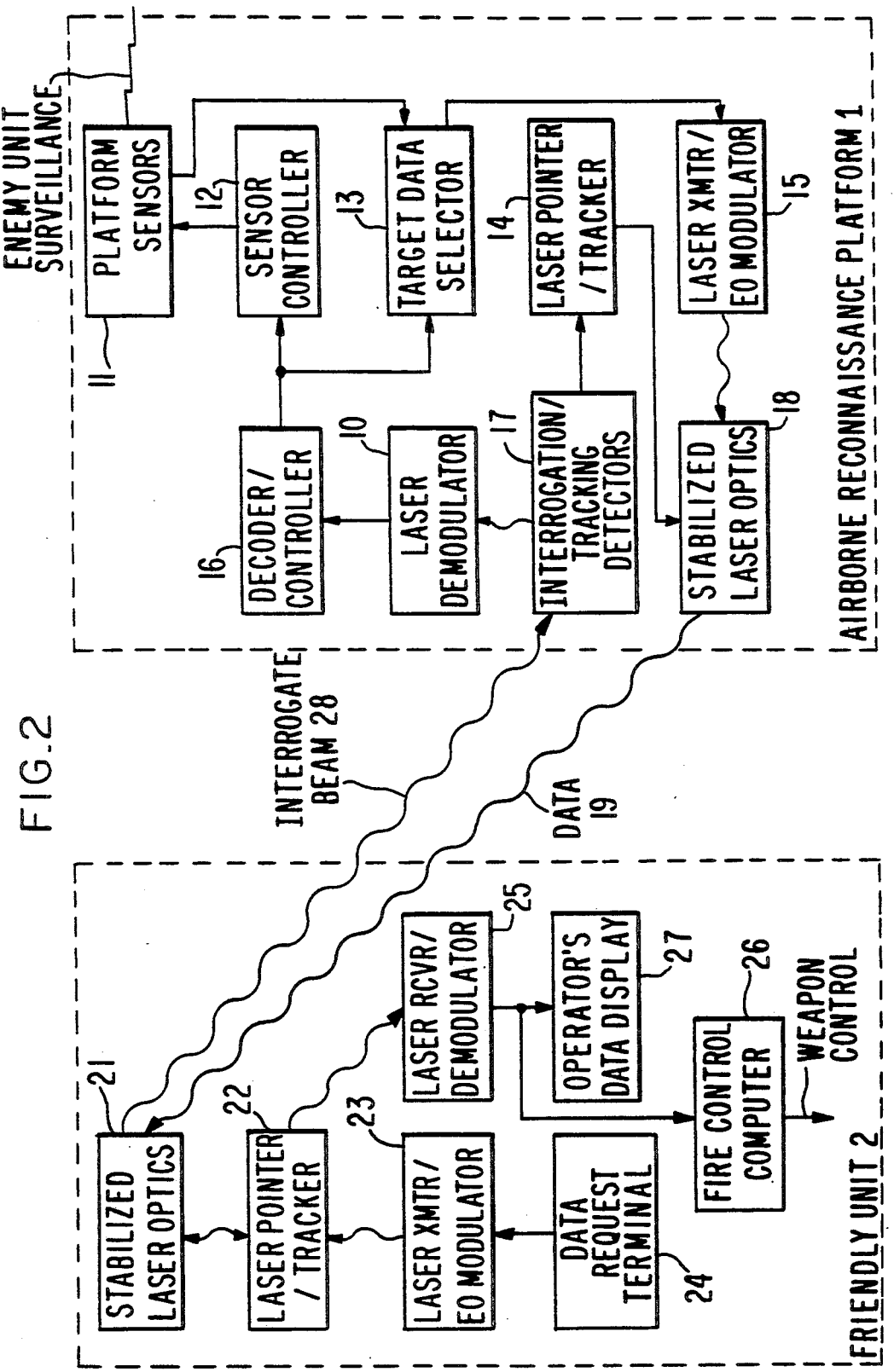
FIG. 2 is a functional block diagram showing important features within airborne reconnaissance platform 1 and each friendly unit 2 of the present invention.
Figure 4:
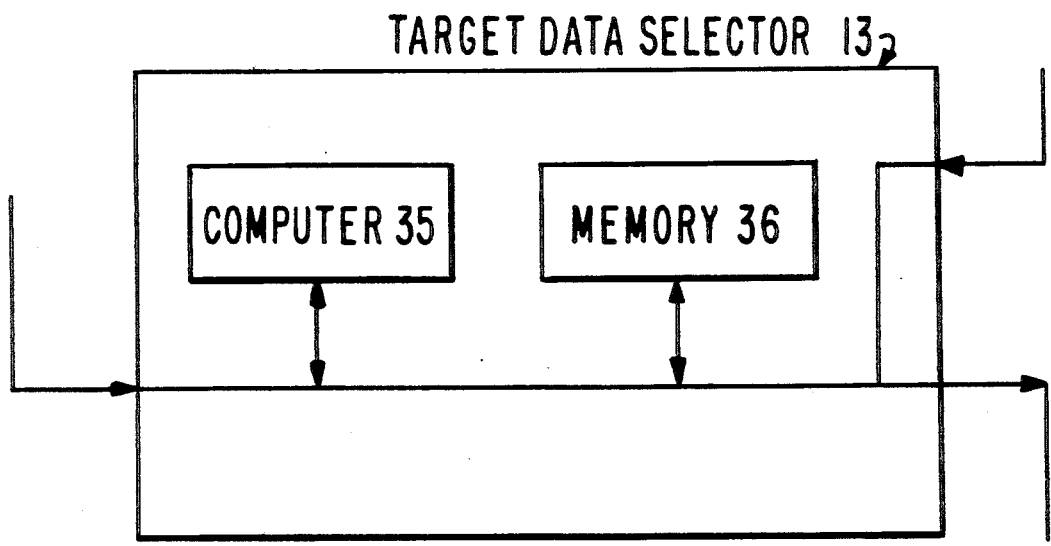
FIG. 4 is a block diagram showing features within target data selector 13 of the present invention.

Turning to FIG. 2, platform sensors 11 place the detected information concerning targets 5 into target data selector 13, which contains a memory, e.g., a short term buffer memory 36, to store such information. Referring also to FIG. 4, associated with target data selector 13 may be a computer 35 capable of discriminating and classifying targets 5. Selected information stored within target data selector 13 (as determined by selection information provided by decoder/controller 16) is fed to laser transmitter/electro-optic modulator 15, which converts the information to a modulation on a laser beam. The information is then fed via stabilized laser optics 18 and data downlink 19 to that friendly unit 2 which requested the information.

The items within the dashed line designating friendly unit 2 in FIG. 2 are common to each said friendly unit 2. Wavy lines in FIG. 2 designate laser links.

The information 19 received from platform 1 passes through stabilized laser optics 21, which points at platform 1 as commanded by associated laser pointer/tracker 22. The received information is then fed to laser receiver/demodulator 25, where it is detected and converted to a longer wavelength. The detected information, which may include real-time video information, is displayed on operator's data display 27 to enable the operator of that friendly unit 2 to determine whether and when his weapons should be launched against the target 5. The detected information is also fed to fire control computer 26, which controls the firing of the weapons. The weapons may be either located on board that friendly unit 2 or associated therewith via a command link.

Conventional apparatus, which may be on board friendly unit 2 and/or airborne reconnaissance platform 1, determines the angle and the range between unit 2 and platform 1. If this information is determined on board platform 1, it is signaled to friendly unit 2 via data link 19. This information is then utilized by fire control computer 26. The precise location of enemy targets 5 relative to a friendly unit 2 is determined by combining knowledge of range and angular position from unit 2 to platform 1 with knowledge of target 5 range and angular position as determined by platform sensors 11 on board the airborne sensor platform 1.

When the operator of friendly unit 2 wishes to request information about possible targets, he feeds his request into data request terminal 24. He may request information about a specific type of target 5 or about targets 5 within a specific proximate geographical location, for example. The requested information is fed to laser transmitter/electro-optic modulator 23, where it is converted to modulation on a laser beam. The modulated information passes through laser pointer/tracker 22 and stabilized laser optics 21, which produces an interrogate beam 28 pointing in the direction of airborne reconnaissance platform 1.

On board airborne reconnaissance platform 1, the interrogate beam 28 is received by interrogation/tracking detectors 17, which determines when and from what direction an interrogation is received. Interrogation/tracking detectors 17 may comprise a plurality of laser detectors arranged along mutually different axes throughout the entire field of view from which interrogation signals may be received by platform 1. The particular detector that is energized determines the direction from which the interrogate beam 28 was received. This directional information is fed to laser pointer/tracker 14, which commands stabilized laser optics 18 to point in this direction so that the subsequent data downlink 19 will be in the proper direction.

Figure 3:
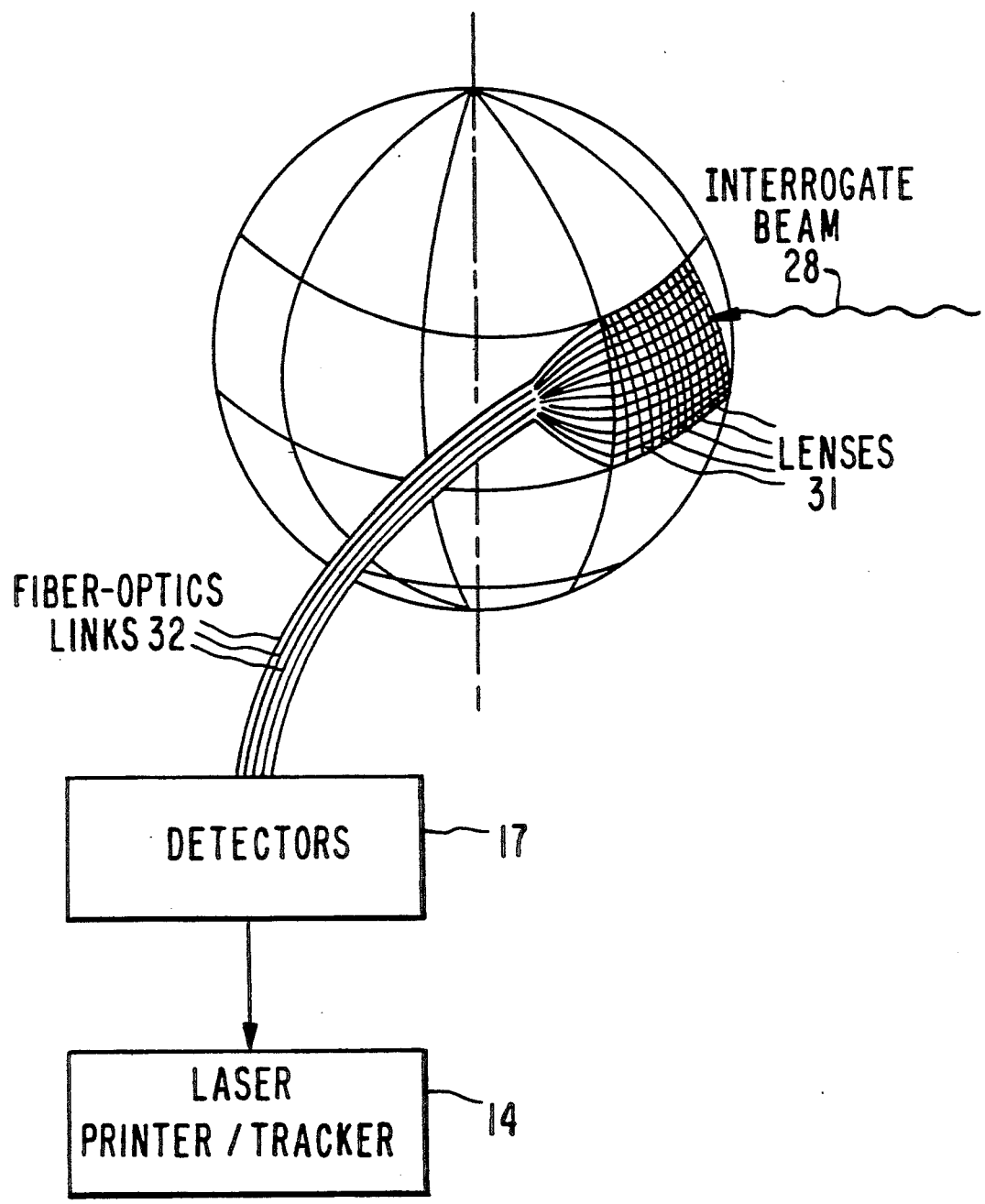
FIG. 3 is a perspective view of an example of apparatus which can determine angular position between airborne reconnaissance platform 1 and friendly unit 2 of the present invention.

Alternative to interrogation/tracking detectors 17 is a configuration shown in FIG. 3: a plurality of lenses 31 disposed along mutually different axes. Each lens 31 is coupled via a fiber-optics link 32 to a single detector 35. The particular fiber-optics link 32 which is energized determines the direction from which interrogate beam 28 was received, and this information is fed to laser pointer/tracker 14.

Figure 5:
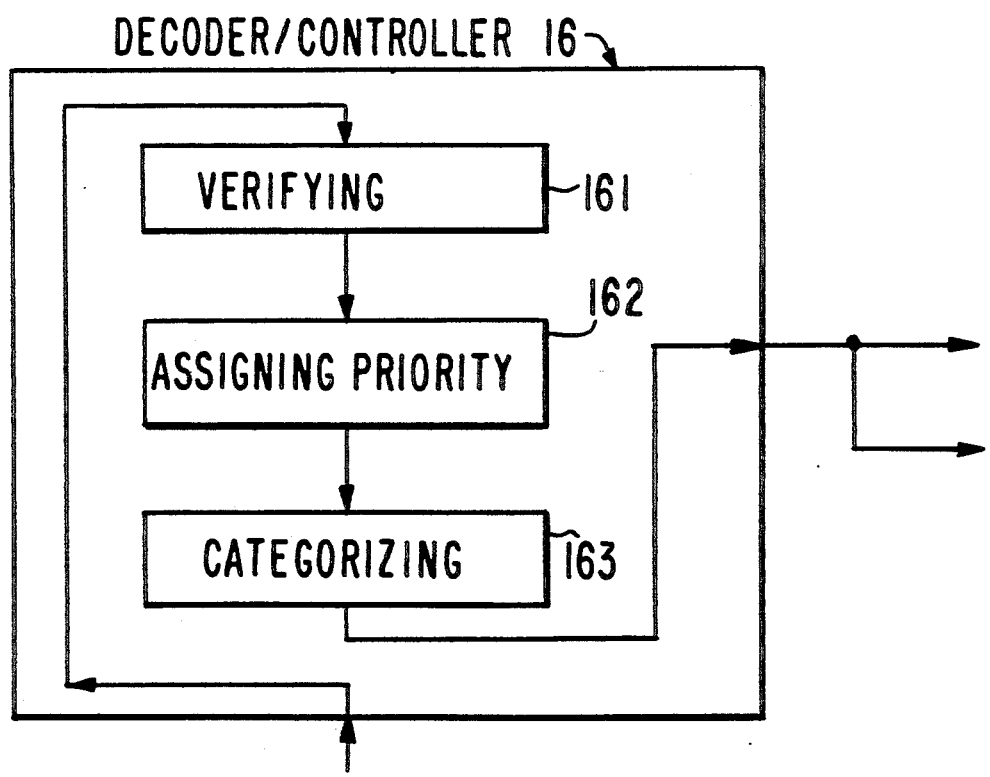
FIG. 5 is a functional block diagram showing important features within decoder/controller 16 of the present invention.

The information modulated onto interrogate beam 28 is demodulated by laser demodulator 10 and fed to decoder/controller 16, which performs the following three important functions as shown in FIG. 5:

1. The validity of the request initiated by friendly unit 2 is verified 161 by comparing coded identification information (impressed into the modulation by terminal 24 or transmitter/modulator 23) with valid codes stored in a memory within decoder/controller 16.

2. The relative priority 162 of the request is determined from priority bits (engendered by terminal 24 or transmitter/modulator 23). If multiple requests are received by platform 1 simultaneously, the one with the highest priority will be processed first.

3. The request is categorized 163 into one of two groups. A first group of requests, comprising real-time video imaging requests, is routed to sensor controller 12, which commands sensors 11 to fetch the requested information and to relay it in a real-time manner to target data selector 13. A second group of requests comprises previously acquired target location information, such as target coordinates and ranges. This second set of requests is fed directly to target data selector 13, whose memory has stored said coordinates and ranges.

If the requested information is not available, target data selector 13 issues a "no target data available" message, which is sent to the requesting friendly unit 2.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, in lieu of the use of a downlink 28 separate and apart from uplink 19, the downlink information could be modulated onto laser uplink 19 in a retrofashion, power levels and signal-to-noise ratios permitting.

Figure 7:
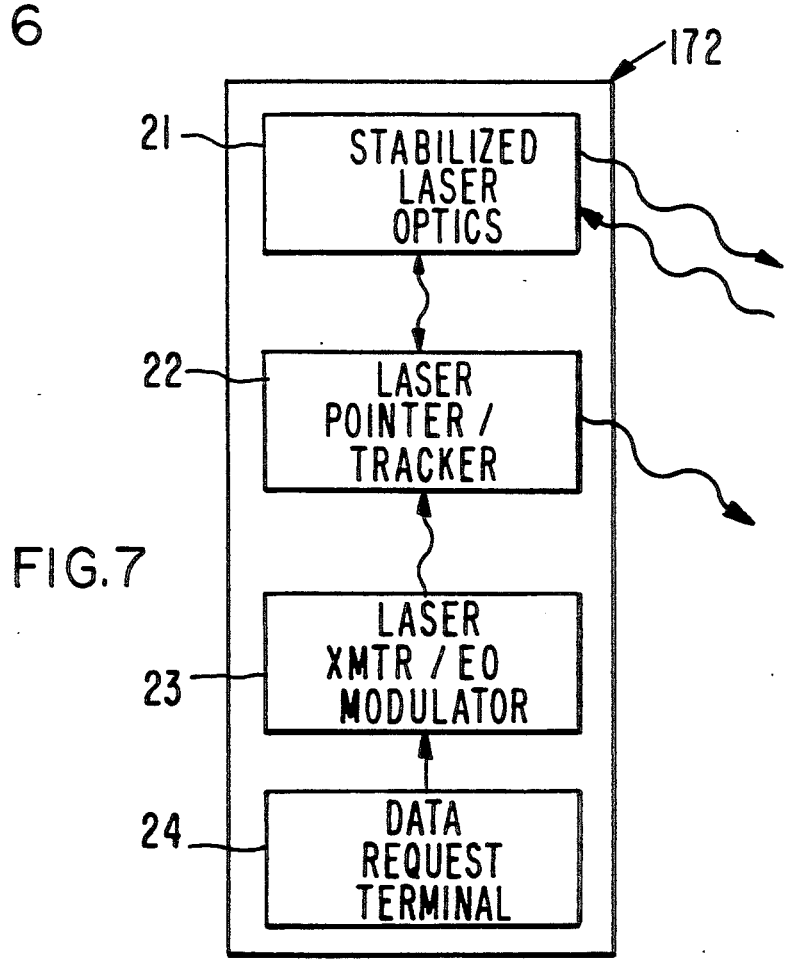
FIG. 7 is a functional block diagram showing important features within the first laser communication means 172 of the present invention.
Figure 8:
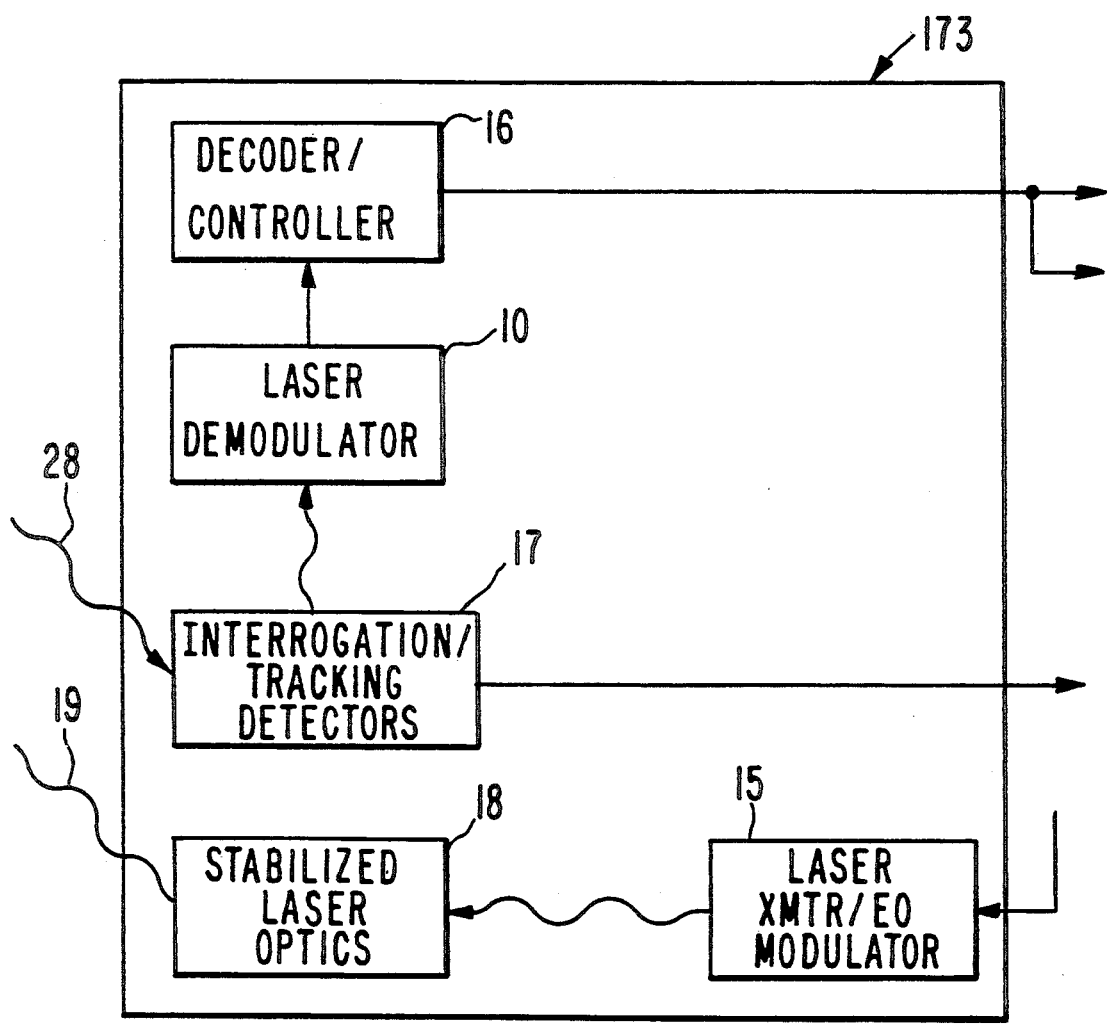
FIG. 8 is a functional block diagram showing important features within the determining means 173 of the present invention.

Turning now to FIG. 6, a second laser communication means 170 is shown as described above. Second laser communications means 170 is situated on airborne reconnaissance platform 1 shown in FIG. 2, and allows the platform to deliver to friendly units 2 in a real-time fashion, targeting information stored in the target data selector 13. FIG. 7 shows a first laser communication means 172 associated with laser friendly unit 2. The first laser communication means interrogates airborne reconnaissance platform 1 as to targeted information regarding targets suitable for that friendly unit 2. FIG. 8 shows determining means 173 which is used for determining when and from what direction airborne reconnaissance platform 1 is being interrogated by friendly unit 2.

What is claimed is:

1. A real-time laser targeting system comprising:
   an airborne reconnaissance platform comprising platform sensors disposed to surveille enemy targets, to produce targeting information in response to said surveillance, and to store said targeting information in an on-board target data selector which comprises a computer that discriminates and classifies the targets;

several friendly units capable of firing weapons at the enemy targets;

first laser communications means situated on board each friendly unit by which each friendly unit can interrogate the airborne reconnaissance platform as to targeting information regarding targets suitable for that friendly unit;

second laser communications means situated on board the airborne reconnaissance platform by which the airborne reconnaissance platform delivers to friendly units in a real-time fashion targeting information stored in said target data selector for targets that are the subject of friendly unit interrogations; and a decoder/controller on board the airborne reconnaissance platform for verifying the validity of requests delivered by the friendly units, assigning priority to each request, and categorizing said requests into those for which targeting data already exists in the target data selector and those for which targeting data does not exist in the target data selector.

2. The laser targeting system of claim 1 wherein the airborne reconnaissance platform is a remote pilotless vehicle; and said system further comprises a ground station that communicates with the remote pilotless vehicle via a two-way data link.

3. The laser targeting system of claim 1 wherein the first laser communications means comprises:

on board each friendly unit, means by which an operator requests targeting information;

coupled to said operator request means, a laser transmitter/electro-optic modulator;

coupled to the laser transmitter/electro-optic modulator, a laser pointer/tracker; and coupled to the laser pointer/tracker, stabilized laser optics from which emanates an interrogation beam pointed at the airborne reconnaissance platform.

4. The laser targeting system of claim 1 wherein the second laser communications means comprises, on board the airborne reconnaissance platform, means for determining when and from what direction the airborne reconnaissance platform is being interrogated by a friendly unit.

5. The laser targeting system of claim 4 wherein the determining means comprises a plurality of laser detectors disposed along mutually different axes.

6. The laser targeting system of claim 4 wherein the determining means comprises a plurality of lenses disposed along mutually different axes, wherein each lens is coupled via a fiber optics link to a laser detector.

7. The laser targeting system of claim 4 wherein the decoder/controller is coupled to the determining means;

the targeting information comprises real-time imaging data; and the real-time imaging data is displayed on a display that is located on-board the friendly unit and is coupled to the first laser communications means.

8. The real-time laser targeting system of claim 1 further comprising, coupled to the platform sensors and situated on board the airborne reconnaissance platform, a sensor controller, wherein requests submitted by friendly units for which targeting data does not exist in the target data selector are routed by the decoder/controller to the sensor controller, which, in response thereto, activates the platform sensors to obtain the requested targeting data.

9. The real-time laser targeting system of claim 1 wherein the decoder/controller selects that data stored within the target data selector that has been requested by a particular friendly unit, and commands the second laser communications means to send said data to said friendly unit.

10. The real-time laser targeting system of claim 1 wherein each friendly unit further comprises, coupled to the first laser communications means, a fire control computer which controls the firing of weapons towards at least one of the enemy targets by means of calculating range and angular position from two sources: range and angular position from the airborne reconnaissance platform to the enemy target as sensed by the platform sensors, and range and angular position from the friendly unit to the airborne reconnaissance platform as determined by determining means that are part of the second laser communications means, said determining means determining when and from what direction the airborne reconnaissance platform is being interrogated by the friendly unit.

11. The system of claim 10 wherein the weapons are stored at a location remote from the friendly unit, and the fire control computer communicates with the weapons location via a communications link.

* * * * *